United States Patent Office 3,118,884
Patented Jan. 21, 1964

3,118,884
DERIVATIVES OF 3-AZAPHENOTHIAZINE AND
3-AZAPHENOXAZINE
Frank H. Clarke, North Caldwell, N.J., assignor to
Schering Corporation, Bloomfield, N.J., a corporation
of New Jersey
No Drawing. Filed Oct. 19, 1959, Ser. No. 847,056
10 Claims. (Cl. 260—243)

The subject of this invention relates to unique heterocyclic compounds and to new and improved processes for their synthesis. More specifically this invention pertains to derivatives of 3-azaphenothiazines and 3-azaphenoxazines which possess valuable and important therapeutic use.

The compounds of the present invention are of the group consisting of bases having the following formula and the acid addition salts thereof:

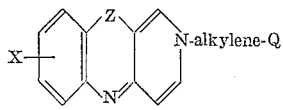

wherein Z represents oxygen and sulfur, X represents hydrogen, halogen, hydroxy, lower alkyl, lower alkoxy, and lower alkanoyloxy; and Q represents tertiary amino.

By the term "-alkylene-" is intended a divalent hydrocarbon chain of from 1 to 6 carbon atoms arranged in a straight or branched alignment.

Those tertiary amino substituents represented by the term Q include dialkylamino groups such a dimethylamino, diethylamino, dibutylamino, methylethylamino; cycloamino groups such as N-methylpiperazino, N-hydroxyethyl piperazino; and the like.

It is apparent from the foregoing that my novel compounds are 3-azaphenothiazines and 3-azaphenoxazines which are substituted on the pyridine nitrogen by an amino alkyl group and which may optionally have additional substitution in the benzo moiety.

The compounds of this invention have been found to possess a surprising level of pharmacological activity in the reduction of high arterial blood pressure with few if any side effects. Furthermore the monohydrochlorides of my compounds show this hypotensive activity when administered via the oral route. Their high therapeutic index and low toxicity render these compounds valuable therapeutic agents for the treatment of hypertension arising from arteriosclerosis, renal damage, hardening of the arteries, essential hyperpiesis, and from side effects of other therapeutic agents.

The preparative route of preference for the compounds of our invention involves the treatment of the appropriate 3-azaphenothiazine or 3-azaphenoxazine with a substituted alkyl halide followed by treatment with base. These reactions are represented as follows:

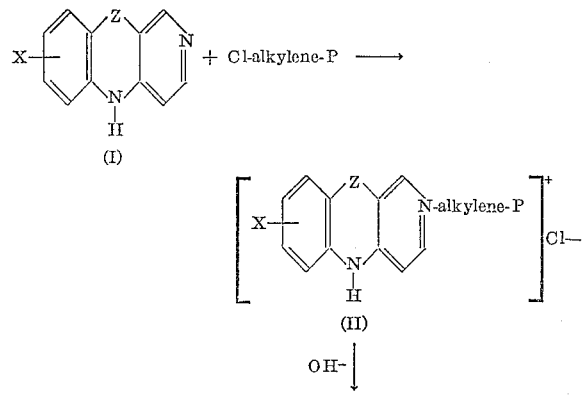

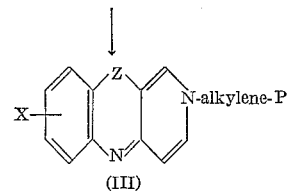

In the above reaction scheme, the group P present in the substituted alkylhalide represents either the amino group to be present in the final compound or a group which may be transformed into the desired amino group. Thus for example, P may represent an ester function. In such a case, treatment with a secondary amine yields the corresponding amide which upon reduction as with lithium aluminum hydride yields tertiary amine.

The orientation at the 3-position of the alkyl side chain in the above described alkylation is of considerable surprise in view of the product obtained when the alkylation is performed on the alkali metal salt of compounds having Formula I. Under these basic conditions the product is the isomeric 10-substituted 3-azaphenothiazine or 3-azaphenoxazine. These reactions are summarized as follows:

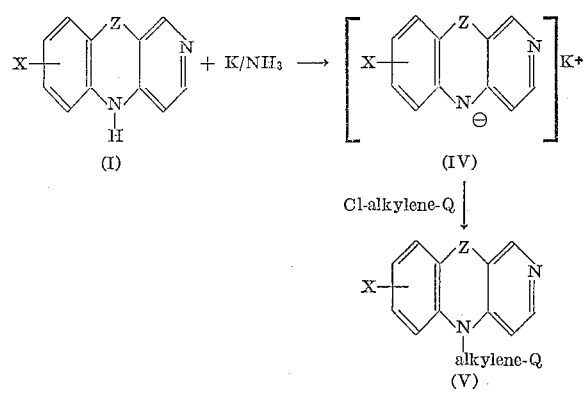

While the products produced via these two alkylation procedures are isomeric in terms of atomic content, their properties, both physical and pharmacological are different. Thus, while 3-(3-dimethylaminoproply)-3-azaphenothiazine dihydrochloride melts at approximately 285° C., the dihydrochloride of the isomer, 10-(3-dimethylaminopropyl)-3-azaphenothiazine melts some twenty degrees lower. In addition the 10-substituted compounds are ataractic agents, possessing none of the salutary hypotensive action of the 3-alkylated compounds.

Furthermore by virtue of the fact that the substituted group is attached to a nitrogen atom of an aromatic ring rather than attached to the bridge nitrogen at position 10, certain alterations occur in the aromatic structure of the pyridine moiety upon conversion of the 3-substituted 3-azaphenothiazinium or 3-substituted 3-azaphenoxazinium salt to the corresponding free base. The structure of this free base may be represented by Formula III shown above wherein it can be seen that the aromatic structure of the pyridine nucleus has shifted to a quinoid-like structure analogous to that found in 1-methyl-4-imino-1,4-dihydropyridine.

In the present application, reference to a 3-substituted 3-azaphenothiazine or 3-substituted 3-azaphenoxazine is intended to inherently indicate the presence in the free base of this quinoid-like structure.

Representative of the compounds of my invention are compounds such as 3-(3-dimethylaminopropyl)-3-azaphenothiazine, 3-(3-dimethylaminopropyl)-3-azaphenoxazine, 8-chloro-3-(3-piperidinopropyl)-3-azaphenothiazine, 7-methyl-3-(3-dimethylaminopropyl)-3-azaphenoxazine, 8-methoxy-3-(2-methyl-3-piperazinopropyl)-3-azaphenothiazine, and the like.

The requisite intermediates for the preparation of my novel compounds are 3-azaphenothiazines and 3-azaphenoxazines and may be prepared via a ring closure reaction. This reaction as shown below may be considered as the intramolecular displacement of a nitro group by the carbanion VI under basic conditions,

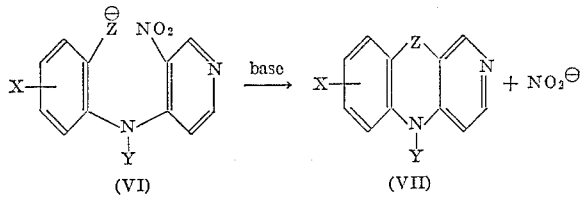

wherein Z represents oxygen or sulfur and Y represents hydrogen or a group such as acetyl or benzyl which facilitates the reaction but is not necessarily present in the final compound.

The carbanion VI may be generated merely by the loss of a proton which occurs under the basic conditions of the reaction. Thus for example treatment of a N-benzyl-N-(3-nitro-4-pyridyl)-2-hydroxyaniline with refluxing aqueous sodium hydroxide results in the formation of a 10-benzyl-3-azaphenoxazine as follows:

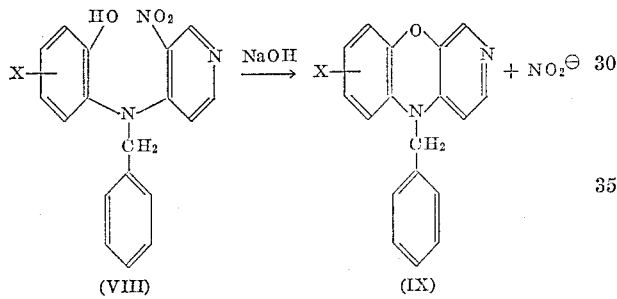

The intermediate represented by Formula VI may also be generated in situ by utilizing the appropriate precursors. Thus I have found that under the proper basic conditions a 2-acetamidophenyl-3-nitro-4-pyridyl sulfide will undergo rearrangement to a carbanion of Formula VI. This rearrangement is apparently followed by spontaneous cyclization to a 10-acetyl-3-azaphenothiazine as shown below:

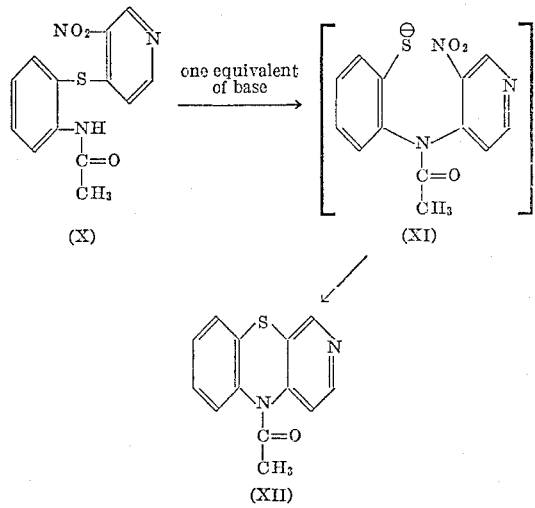

While this rearrangement is also applicable in the preparation of certain 3-azaphenoxazines its primary utility lies in the preparation of 3-azaphenothiazines. The requisite intermediate for this rearrangement is prepared by first treating 2-aminothiophenol with 3-nitro-4-chloropyridine in the presence of base to yield 2-aminophenyl 3-nitro-4-pyridyl sulfide and then acetylating this compound to yield 2-acetamidophenyl 3-nitro-4-pyridyl sulfide which is rearranged as heretofore described. By employing 2-aminothiophenol substituted at various positions in the aromatic ring, the correspondingly substituted 3-azaphenothiazines can be prepared. Thus for example, by starting with 2-amino-5-methylthiophenol and following the procedure described herein, there is obtained upon ring closure via rearrangement the compound, 6-methyl-3-azaphenothiazine.

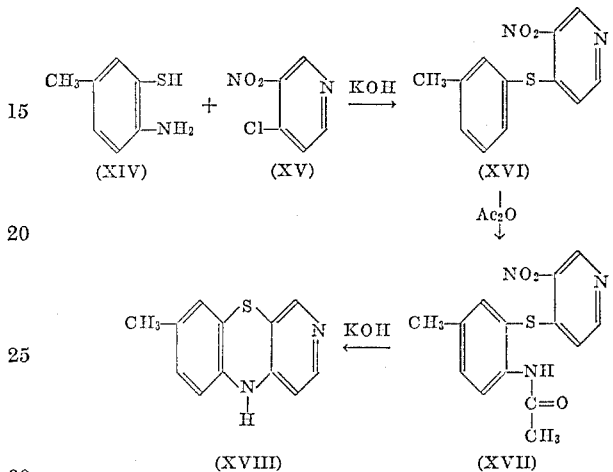

By employing excess base in the ring closure reaction, the acetyl group is cleared simultaneous to the ring closure, hence yielding the azaphenothiazine unsubstituted at position 10.

Analogous starting compounds may be used for preparation of the 3-azaphenoxazine intermediates. In place of 2-aminothiophenol, 2-aminophenol is employed, preferably in the form of the aminobenzyl derivative which facilitates the rearrangement. There is thus directly formed N-benzyl-N-(3-nitro-4-pyridyl)-2-hydroxy aniline which upon further treatment with base cyclizes to form 10-benzyl-3-azaphenoxazine. Catalytic reduction as with palladium on carbon then yields the 3-azaphenoxazine.

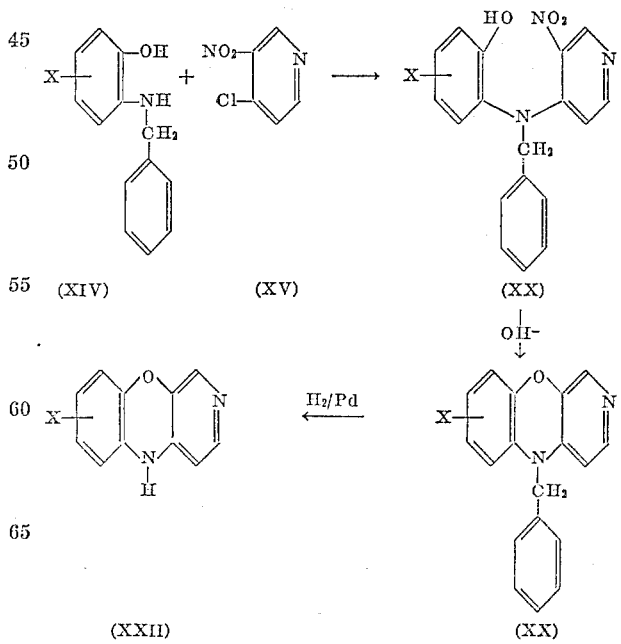

These 3-azaphenothiazines and 3-azaphenoxazines are then alkylated as heretofore described. The final product may then be converted to the mono-acid addition salt, diacid addition salt or left as the free base.

The following examples are typical of the compounds embraced by my invention. These examples however are

EXAMPLE 1

*3-Azaphenothiazine*

(A) *2-aminophenyl 3-nitro-4-pyridyl sulfide.*—To a stirred ice-cooled solution of 80.0 g. (1.42 moles) of potassium hydroxide in 500 ml. of water is added 100.0 g. (0.80 mole) of 2-aminothiophenol, followed by 650 ml. of dioxane. 4-chloro-3-nitro-pyridine hydrochloride (122.0 g.), (0.63 mole), is then added and the solution stirred with ice-water cooling for 2 hours. Ice water (2 l.) is then added to the reaction mixture and the solid is collected, washed first with cold dilute aqueous alkali, then with ice water. The crude product (M.P. 134–137°) is recrystallized from about 2 l. of 95% ethanol to give 2-aminophenyl 3-nitro-4-pyridyl sulfide, M.P. 150–151° C.

(B) *2-acetamidophenyl 3-nitro-4-pyridyl sulfide.*—2-aminophenyl 3-nitro-4-pyridyl sulfide (105.0 g.) is covered with 300 ml. of acetic anhydride and the mixture heated on the steam bath for 15 minutes, during which time the solid completely dissolves. The hot solution is poured onto ice and 500 ml. of 28% aqueous ammonia solution is added. The yellow solid is collected, dried, and recrystallized from 300 ml. of 95% ethanol to give 2-acetamidophenyl 3-nitro-4-pyridyl sulfide, M.P. 123–124° C.

(C) *3-azaphenothiazine.*—To a stirred refluxing solution of 32.5 g. (0.089 mole) of 2-acetomidophenyl 3-nitro-4-pyridyl sulfide in 2500 ml. of acetone under nitrogen is added 14.5 g. (0.26 mole) of powdered potassium hydroxide in small portions over a 30 minute period. The stirring and refluxing under nitrogen are continued for one hour and then the acetone is distilled over 1½ hours, vacuum being used at the end. Approximately one liter of ice water is added to the residue, the mixture is stirred, and the solid is collected, washed well with water and dried to give 3-azaphenothiazine as a light yellow solid, which upon recrystallization from ethanol or acetone melts at 246–248° (dec.).

U. V. $\lambda_{max.}^{MeOH}$ 230 m$\mu$ (S) (4.11); 256 m$\mu$ (4.61); 260 m$\mu$ (4.61); 318 m$\mu$ (3.54).

3-azaphenothiazine hydrochloride forms orange crystals upon addition of ethanolic hydrogen chloride to a solution of the base in acetone, M.P. 279–281° (dec.).

U. V. $\lambda_{max.}^{MeOH}$ 237 m$\mu$ (S) (4.13); 256 m$\mu$ (S) (4.42); 262 m$\mu$ (4.42); 274 m$\mu$ (4.44); $\lambda_{max.}^{0.1 N\ HCl}$ 234 m$\mu$ (4.15); 265 m$\mu$ (4.50); 272 m$\mu$ (4.51).

3-azaphenothiazine hydrobromide forms yellow crystals from ethanolic hydrogen bromide and is recrystallized from aqueous ethanol for analysis, M.P. 263–265° (dec.).
U.V. same as for the hydrochloride salt.

3-azaphenothiazine is also prepared by adding a solution of 60 g. (1.07 moles) of potassium hydroxide in 480 ml. of 94% ethanol over a 2 hour period to a stirred, refluxing solution of 150 g. (0.52 mole) of 2-acetomidophenyl 3-nitro-4-pyridyl sulfide in 8 liters of acetone under nitrogen. Stirring and refluxing under nitrogen is continued for an additional hour, then the solution is cooled and anhydrous hydrogen chloride gas is passed into the solution until a test portion is acidic to moist litmus paper. The solid is collected, washed with acetone, then stirred with 3 l. of hot water. The aqueous solution is treated with charcoal, filtered hot, then cooled, treated with filter cell and filtered again. To the cold filtrate is added concentrated aqueous ammonia to alkaline reaction. The yellow precipitate is collected, washed with water, dried in vacuo and recrystallized from acetone to give 3-azaphenothiazine, constants as above.

In a similar fashion by employing substituted 2-aminothiophenols in place of 2-aminothiophenol in part A of this example and following the procedure herein set forth there are prepared the correspondingly substituted 3-azaphenothiazines. For example by substituting 2-amino-4-chlorothiophenol, 2-amino-4-methylthiophenol, 2-amino-5-chlorothiophenol, and 2-amino-5-methoxythiophenol in this procedure there are prepared in respective order 7-chloro-3-azaphenothiazine, 7-methyl-3-azaphenothiazine, 6-chloro-3-azaphenothiazine, and 6-methoxy-3-azaphenothiazine.

EXAMPLE 2

*3-Azaphenoxazine*

(A) *N-benzyl-4-(2'-hydroxyanilino)-3-nitropyridine.*—To a stirred, refluxing solution of 64.5 g. of o-benzylaminophenol and 63.7 g. of 4-chloro-3-nitropyridine hydrochloride in 1500 ml. of acetone is added 40.4 g. of dry, powdered potassium hydroxide over a period of one hour. Stirring under reflux is continued for two more hours, then the reaction mixture is cooled, filtered and concentrated on the steam bath with the addition of hot cyclohexane to displace the acetone. Finally the solution is allowed to cool slowly and the crude product is collected by filtration and recrystallized from acetone-cyclohexane to give N-benzyl-4-(2'-hydroxyanilino)-3-nitropyridine, M.P. 180–182° (dec.).

(B) *10-benzyl-3-azaphenoxazine.*—A solution of 40.0 g. of N-benzyl-4-(2'-hydroxyanilino)-3-nitropyridine in 400 ml. of 10% aqueous sodium hydroxide is refluxed for 3 hours, then cooled and decanted from the precipitated product. The product is crystallized from acetone-cyclohexane, after clarification with charcoal, to give 10-benzyl-3-azaphenoxazine, M.P. 136–137° C.

The hydrochloride forms yellow crystals from ethanol-ether, M.P. 270–272° C.

(C) *3-azaphenoxazine.*—A mixture of 10.0 g. of 10-benzyl-3-azaphenoxazine, 10.0 g. of 5% palladium on charcoal and 150 ml. of n-butanol is shaken on a Parr hydrogenation apparatus at 60–70° C. under 40–50 p.s.i. of hydrogen for 19 hours. The catalyst is filtered off and washed with warm n-butanol, concentrated to a small volume and cooled to give the crude product, which upon recrystallization from acetone-cyclohexane yields 3-azaphenoxazine, M.P. 246–247° C.

The hydrochloride forms yellow crystals from methanolethyl acetate, M.P. 251–252.5° C.

In a similar fashion by employing substituted o-benzylaminophenols in part A of this example, there are prepared the correspondingly substituted 3-azaphenoxazines. For example by employing 2-benzylamino-4-chlorophenol; 2-benzylamino-4-bromophenol; 2-benzylamino-4-methylphenol; 2-benzylamino-5-chlorophenol; 2-benzylamino-5-bromophenol; and 2-benzylamino-5-methylphenol, there are prepared in respective order, 7-chloro-3-azaphenoxazine; 7-bromo-3-azaphenoxazine; 7-methyl-3-azaphenoxazine; 6-chloro-3-azaphenoxazine; 6-bromo-3-azaphenoxazine; and 6-methyl-3-azaphenoxazine.

EXAMPLE 3

*3-(3-Dimethylaminopropyl)-3-Azaphenothiazine*

A solution of 15.0 g. of 3-azaphenothiazine and 37 ml. of 3-dimethylaminopropyl chloride in 325 ml. of anhydrous dioxane is refluxed for 24 hours, and then the solvent is distilled off. The residue is triturated with water and filtered, and the filtrate is made strongly alkaline with 50% aqueous sodium hydroxide solution. The precipitate is taken up in methylene chloride, the solvent is evaporated and the residue is crystallized several times from ether to give the product 3-(3-dimethylaminopropyl) - 3 - azaphenothiazine as orange crystals, M.P. 95–96° C., B.P. 175–210° C./0.005 mm.

The dihydrochloride is formed by passing an excess of anhydrous hydrogen chloride through an ethereal solution of the free base. There is thus obtained upon filtration yellow crystals which upon recrystallization from methanol-ethanol melts at 285–286° (dec.).

The monohydrochloride is formed in methanolic solution by adding one equivalent of anhydrous methanolic hydrogen chloride. The solution is concentrated and ether is added to give the salt as orange colored crystals, which upon recrystallization from methanol-ether melts at 170–172° C.

The monohydrochloride is alternatively formed by dissolving molar equivalents of the free base and the dihydrochloride in methanol and displacing the boiling methanolic solution by the gradual addition of acetone. Upon cooling there is obtained the monohydrochloride.

The dihydrobromide, obtained as yellow crystals from ethanol, melts at 261–265° (dec.).

There are similarly prepared via the above procedure the following compounds by employing the corresponding 3-azaphenothiazine; 3-(3 - dimethylaminopropyl) - 7-chloro-3-azaphenothiazine, 3-(3-dimethylaminopropyl)-7-methyl-3-azaphenothiazine, 3-(3-dimethylaminopropyl)-6-chloro-3-azaphenothiazine, and 3-(3-dimethylaminopropyl)-6-methoxy-3-azaphenothiazine.

EXAMPLE 4

3-(3-Dimethylaminopropyl)-3-Azaphenoxazine

A solution of 2.9 g. of 3-azaphenoxazine and 12 ml. of 3-dimethylaminopropyl chloride in 60 ml. of anhydrous dioxane is refluxed for 16 hours. The solution is cooled and decanted from the gummy precipitate. The precipitate is dissolved in water, the solution is made strongly alkaline with 50% aqueous sodium hydroxide, and extracted with methylene chloride. The methylene chloride extract is dried over anhydrous sodium sulfate and evaporated to dryness and recrystallized several times from ether to yield 3-(3-dimethylaminopropyl)-3-azaphenoxazine. This is then converted to the dihydrochloride with anhydrous hydrogen chloride in ether-methanol and recrystallized from isopropanol to give 3-(3-dimethylaminopropyl)-3-azaphenoxazine dihydrochloride, M.P. 261–262.5° C. Similarly the monochloride is prepared in the manner of Example 3.

There may similarly be prepared the following compounds by employing the correspondingly substituted 3-azaphenoxazines: 3-(3-dimethylaminopropyl)-7-chloro-3 - azaphenoxazine; 3-(3-dimethylaminopropyl)-7-bromo-3-azaphenoxazine; 3-(3-dimethylaminopropyl)-7-methyl-3 - azaphenoxazine; 3-(3-dimethylaminopropyl)-6-bromo-3 - azaphenoxazine; 3-(3-dimethylaminopropyl)-6-methyl-3-azaphenoxazine.

EXAMPLE 5

3-(3-Piperidinopropyl)-3-Azaphenothiazine Dihydrochloride

A solution of 5.0 g. of 3-azaphenothiazine and 10 ml. of 3-piperidinopropyl chloride in 80 ml. of dioxane is refluxed for 15 hours. The gum which forms is dissolved in water, the solution made alkaline with 50% aqueous sodium hydroxide solution, and the precipitate which forms taken up in methylene chloride. After drying over anhydrous sodium sulfate the methylene chloride is removed in vacuo and the residue recrystallized from ether to give 3-(3-piperidinopropyl)-3-azaphenothiazine.

The free base is treated with anhydrous methanolic hydrogen chloride and ether in the manner of Example 2 to give 3-(3-piperidinopropyl)-3-azaphenothiazine dihydrochloride as golden yellow crystals, M.P. 295–296° (dec.). pKa values 7.75 and 11.0 in 66% aqueous dimethyl formamide; equivalent weight: Calcd. for $C_{19}H_{23}N_3S \cdot 2HCl$: 199.1. Found: 202.8.

Alternatively the above product is obtained by refluxing a solution of 1.0 g. of 3-azaphenothiazine and 2.0 g. of 3-piperidinopropylchloride hydrochloride in 50 ml. of absolute ethanol for 65 hours and concentrating the solution to less than 5 ml. whereupon the dichloride crystallizes out on cooling.

The monohydrochloride is prepared in the manner described in Example 3.

In a similar fashion by substituting 3-azaphenoxazine for 3-azaphenothiazine in the above procedure, there is obtained 3-(3-piperidinopropyl)-3-azaphenoxazine from which the monohydrochloride and dihydrochloride are prepared as recited herein.

EXAMPLE 6

3-[3-(N-[2-Hydroxyethyl]-Piperazino)-Propyl]-3-Azaphenothiazine 3-azaphenothiazine is treated with 3-[N-(2-hydroxyethyl)-piperazino]-propyl chloride being substituted for 3-piperidinopropyl chloride in the procedure of Example 5. Purification as therein described yields 3-[3-(N-[2-hydroxyethyl]-piperazino)-propyl]-3-azaphenothiazine.

By employing 7-chloro-3-azaphenothiazine, 7-methyl-3-azaphenothiazine, 6-chloro-3-azaphenothiazine, and 6-methoxyphenothiazine there are prepared in respective order, 3 - [3-(N-[2-hydroxyethyl]-piperazino)-propyl]-7-chloro - 3 - azaphenothiazine; 3-[3-(N-[2-hydroxyethyl]-piperazino)-propyl]-7-methyl-3-azaphenothiazine; 3 - [3-(N-[2-hydroxyethyl]-piperazino)-propyl]-6-chloro-3-azaphenothiazine; 3 - [3 - (N-[2-hydroxyethyl]-piperazino)-propyl]-6-methoxy-3-azaphenothiazine.

In a similar fashion 3-azaphenoxazine is employed in this example in place of 3-azaphenothiazine and there is prepared, 3-[3-(N-[2-hydroxyethyl]-piperazino)-propyl]-3-azaphenoxazine.

Likewise by starting with 7-chloro-3-azaphenoxazine, 7-bromo-3-azaphenoxazine, 7 - methyl-3-azaphenoxazine, 6-bromo-3-azaphenoxazine and 6-methyl - 3 - azaphenoxazine, there are prepared in respective order, 3-[3-(N-[2-hydroxyethyl]-piperazino) - propyl] - 7 - chloro - 3 - azaphenoxazine; 3-[3-(N - [2 - hydroxyethyl] - piperazino)-propyl]-7-bromo-3-azaphenoxazine; 3-[3-(N-[2-hydroxyethyl]-piperazino)-propyl]-7-methyl - 3 - azaphenoxazine; 3 - [3 - (N - [2 - hydroxyethyl] - piperazino) - propyl]-6-bromo - 3 - azaphenoxazine; 3-[3-(N-[2-hydroxyethyl]-piperazino)-propyl]-6-methyl-3-azaphenoxazine.

The monohydrochlorides and dihydrochlorides of all the final products prepared in this example are obtained in the manner of Example 3.

EXAMPLE 7

3-(4-Piperidinobutyl)-3-Azaphenothiazine

By employing hydrobromide of 4-piperidinobutyl chloride for the hydrochloride of 3-piperidinopropyl chloride in the alternative procedure of Example 5 and treating 3-azaphenothiazine as therein described there is prepared the mixed dihydrohalide salt, 3-(4-piperidinobutyl)-3-azaphenothiazine hydrochloride hydrobromide.

This substance when treated with aqueous sodium hydroxide is converted to the free base which is isolated by extraction with methylene chloride, drying of these extracts, reduction of the extracts to a residue in vacuo, and recrystallization from ether. 3-(4-piperidinobutyl)-3-azaphenothiazine thus obtained is converted to the dihydrochloride or monohydrochloride as described in Example 5.

By employing 2-piperidinoethyl chloride (as the hydrobromide) in place of 4-piperidinobutyl chloride hydrobromide in this example there is prepared 3-(2-piperidinoethyl)-3-azaphenothiazine.

EXAMPLE 8

3-(3-Dimethylaminobutyl)-3-Azaphenothiazine 3-dimethylaminobutyl chloride hydrochloride is substituted for 3-piperidinopropyl chloride hydrochloride in the alternative procedure of Example 5. There is thus prepared upon purification in the prescribed manner, 3-(3- dimethylaminobutyl)-3-azaphenothiazine dihydrochloride.

Similarly by converting 2-chloro-3-methylbutyl-diethylamine to the hydrochloride by treatment of an ethereal solution of same with anhydrous hydrogen chloride and employing this hydrochloride in place of 3-piperidinopropyl chloride in the alternative procedure of Example 5, there is prepared 3-(1-isopropyl-2-diethylaminoethyl)-3-azaphenothiazine dihydrochloride.

EXAMPLE 9

*3-(2-Morpholinoethyl)-7-Chloro-3-Azaphenothiazine*

To a solution of 13.4 g. of 2-bromoethyl chloride in 50 ml. of ether is added 8.2 g. of morpholine. The mixture is allowed to stand 1 hour and then refluxed for an additional hour. The solution is next cooled and to it is added 15 g. of 3-azaphenothiazine. The mixture is again brought to reflux and maintained thereat for 2 days. It is then reduced to a residue and dissolved in 50% aqueous sodium hydroxide. The solution is then extracted with methylene chloride, washed with water, dried over sodium sulfate, and reduced to a residue which is recrystallized from ether to yield 3-(2-morpholinoethyl)-7-chloro-3-azaphenothiazine.

The dihydrochloride of the product of this example is prepared from the above methylene chloride solution by adding methanolic hydrogen chloride.

The monohydrochloride is prepared by treatment of the free base with one equivalent of hydrogen chloride or by the addition to the dichloride of one equivalent of base.

EXAMPLE 10

*3-(3-Dimethylaminopropyl)-3-Azaphenothiazine Maleate*

One gram of 3-(3-dimethylaminopropyl)-3-azaphenothiazine is dissolved in 25 ml. of ethyl acetate and to it is added 0.4 g. of maleic acid in sufficient ethyl acetate for dissolution. The resultant solution is allowed to stand until crystallization occurs and is then heated on a steam bath for ½ hour. The solution is then cooled in an ice-salt bath and the solid thereby formed collected by filtration. Upon recrystallization from ethanol-ether, there is obtained 3-(3-dimethylaminopropyl)-3-azaphenothiazine maleate.

In a similar fashion, by employing 3-(3-dimethylaminopropyl)-3-azaphenoxazine in the above procedure there is prepared 3-(3-dimethylaminopropyl)-3-azaphenoxazine maleate.

Use of tartaric acid, succinic acid and citric acid in the above procedure results in the formation of 3-(3-dimethylaminopropyl)-3-azaphenothiazine tartrate, 3-(3-dimethylaminopropyl)-3-azaphenothiazine succinate, and 3-(3-dimethylaminopropyl)-3-azaphenothiazine citrate.

I claim:

1. A chemical compound of the class consisting of a free base, and its non-toxic pharmaceutically acceptable acid addition salts, the free base having the structural formula:

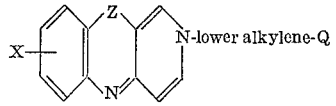

wherein Z is a member selected from the group consisting of S and O, X is a member of the group consisting of hydrogen, chloro, bromo, lower alkyl and lower alkoxy, and Q is a member selected from the group consisting of diloweralkylamino, N-loweralkylpiperazino, N-hydroxyloweralkylpiperazino, piperidino, piperazino and morpholino.

2. A chemical compound having the formula:

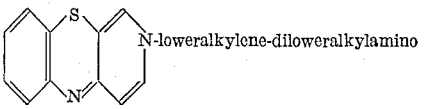

3. A chemical compound having the formula:

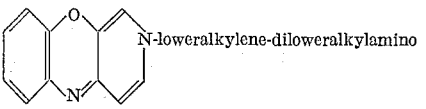

4. A chemical compound having the structural formula:

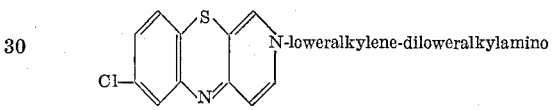

5. A chemical compound having the structural formula:

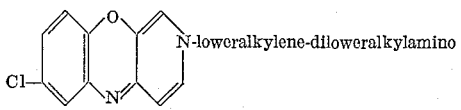

6. 3-(3-dimethylaminopropyl)-3-azaphenothiazine.
7. 3 - (3 - dimethylaminopropyl) - 7 - chloro - 3-azaphenothiazine.
8. 3-(3-dimethylaminopropyl)-3-azaphenoxazine.
9. 3-(3-piperidinopropyl)-3-azaphenothiazine.
10. 3 - [3 - (N - [2 - hydroxyethyl] - piperazino)-propyl]-3-azaphenothiazine.

References Cited in the file of this patent

UNITED STATES PATENTS

| | | |
|---|---|---|
| 2,850,501 | Voegtli | Sept. 2, 1958 |
| 2,852,520 | Robinson | Sept. 16, 1958 |

FOREIGN PATENTS

| | | |
|---|---|---|
| 797,061 | Great Britain | June 25, 1958 |
| 217,538 | Australia | Sept. 18, 1958 |